(12) United States Patent
Wu et al.

(10) Patent No.: US 9,507,052 B2
(45) Date of Patent: Nov. 29, 2016

(54) AUTOMATIC RECOGNITION METHOD OF CONTINENTAL SLOPE FOOT POINT BASED ON TERRAIN GRID

(71) Applicant: The Second Institute of Oceanography, SOA, Hangzhou, Zhejiang Province (CN)

(72) Inventors: Ziyin Wu, Hangzhou (CN); Jiabiao Li, Hangzhou (CN); Shoujun Li, Hangzhou (CN); Jihong Shang, Hangzhou (CN)

(73) Assignee: THE SECOND INSTITUTE OF OCEANOGRAPHY, SOA, Hangzhou, Zhejiang Province (CN)

( * ) Notice: Subject to any disclaimer, the term of this patent is extended or adjusted under 35 U.S.C. 154(b) by 33 days.

(21) Appl. No.: 14/414,285

(22) PCT Filed: Nov. 28, 2013

(86) PCT No.: PCT/CN2013/088043
§ 371 (c)(1),
(2) Date: Jan. 12, 2015

(87) PCT Pub. No.: WO2014/082585
PCT Pub. Date: Jun. 5, 2014

(65) Prior Publication Data
US 2015/0192695 A1   Jul. 9, 2015

(30) Foreign Application Priority Data

Nov. 28, 2012   (CN) .......................... 2012 1 0504124

(51) Int. Cl.
G06F 7/60       (2006.01)
G06F 17/10      (2006.01)
G01V 99/00      (2009.01)
G06F 17/11      (2006.01)

(52) U.S. Cl.
CPC ............. *G01V 99/005* (2013.01); *G06F 17/10* (2013.01); *G06F 17/11* (2013.01); *G06F 2217/16* (2013.01)

(58) Field of Classification Search
CPC ........ G06F 17/50; G06F 17/10; G06F 17/11; G06F 2217/16; G01V 99/005
USPC ............................................................ 703/2
See application file for complete search history.

(56) References Cited

U.S. PATENT DOCUMENTS

2004/0085319 A1   5/2004   Gannon

FOREIGN PATENT DOCUMENTS

| CN | 1753033 A   |   | 3/2006 |
|----|-------------|---|--------|
| CN | 1753033 A   | * | 3/2006 |
| CN | 101261743 A |   | 9/2008 |

OTHER PUBLICATIONS

Stagpoole, Vaughan et al. "Foot of the Continental Slope in Article 76", 2003, ABLOS '03.*
The Republic of Costa Rica Preliminary Information Indicative of the Outer Limits of the Continental Shelf and Description of the Status of Preparation of Making a Submission to the Commision on the Limits of the Continental Shelf, May 2009.*
Liu, Jinliang, "Improvement in Runoff Parameterization for Global Climate Modeling", 2001, Graduate Department of Physics, University of Toronto.*

* cited by examiner

*Primary Examiner* — Cedric D Johnson
(74) *Attorney, Agent, or Firm* — Jiwen Chen

(57) ABSTRACT

An automatic recognition method of foot point of continental slope based on topography grid, comprising the steps of cutting a topography grid model through a straight line or a broken line to generate a two-dimensional topography section line, then carrying out first derivation on the two-dimensional topography section to generate a slope section line and a second derivative section line, then obtaining an extreme point of the second derivative section line, using a D-P algorithm to obtain a D-P topography section after second simplification, then carrying out second derivation on the D-P topography section and using a topography and slope judgment method to recognize and eliminate concave hull topography in the D-P section, and finally using judgment methods as slope, water depth, second derivation, concavity and convexity, continuity and segmentation based on the D-P topography, slope and second derivative section to form a recognition method.

1 Claim, 5 Drawing Sheets

AUTOMATIC RECOGNITION METHOD OF CONTINENTAL SLOPE FOOT POINT BASED ON TERRAIN GRID

This is a U.S. national stage application of PCT Application No. PCT/CN2013/088043 under 35 U.S.C. 371, filed Nov. 28, 2013 in Chinese, claiming the priority benefit of Chinese Application No. 20120504124.4, filed Nov. 28, 2012, which is hereby incorporated by reference.

TECHNICAL FIELD

The present invention relates to a recognition method of submarine topography, and in particular, to a technical method which can generate a topography section line based on the grid of the submarine topography, and can automatically analyze the submarine topography section, thus automatically recognizing the foot point of the continental slope, and relates to the field of computer graphics, submarine science and maritime delimitation.

BACKGROUND ART

The foot point of a continental slope is the most important boundary point in delimitation of the continental shelf 200 nautical miles away, which may affect the precision of 60 nautical mile lines extrapolated from the foot point of the continental slope and 1% sediment thickness contours as well as the final outer limit. To perform intelligent analysis on the two-dimensional topography section so as to automatically recognize the foot point of the continental slope has important application values both on the aspect of the delimitation of the continental shelf exceeding 200 nautical miles, automatic recognition of the two-dimensional topography section features and two-dimensional topography section drawing.

It is stipulated in Article 76 of United Nations Convention on the Law of the Sea signed into the law in 1982 that: "the continental shelf of a coastal state comprises the seabed and subsoil of the submarine areas that extend beyond its territorial sea throughout the natural prolongation of its land territory to the outer edge of the continental margin, or to a distance of 200 nautical miles from the baselines from which the breadth of the territorial sea is measured where the outer edge of the continental margin does not extend up to that distance." If the coastal state proposes that the distance exceeds 200 nautical miles from the baselines from which the breadth of the territorial sea is measured, then the outer edge of the continental shelf excluding 200 nautical miles should be delimited according to relevant requirements of Article 76 of the United Nations Convention on the Law of the Sea and Article 4 of its annex, and a delimitation proposal should be submitted to the UN Commission on the Limits of the Continental Shelf.

The key evidence for the delimitation of the continental shelf exceeding 200 nautical miles is series of delimitation limits, comprising the foot point of the continental slope (referred to as FOS), formula lines (FOS+60M line and 1% sediment thickness contours), boundary lines (350M line and 2500 m+100M line) and outer limit and the like. The FOS is the most important boundary point because the FOS is the origin for determining the series limit of the continental shelf exceeding 200 nautical miles. The FOS will directly affect the accuracy of the FOS+60M lien and the 1% sediment thickness contours, and finally affect the coordinates of the outer limit and the determined area. If the FOS is wrong or has larger error, it may generate significant impact on the final outer limit.

Analyzed from the retrieved public data, at present, there are no mature technical methods used for automatic recognition of the foot point of the continental slope domestically. Although the delimitation of the continental shelf excluding 200 nautical miles is introduced in few literatures, faithful contents of the method for automatically generating the foot point of the continental slope are lacked, and the prior art is not sufficient to support the recognition and generation of the foot point of the continental slope.

SUMMARY OF THE INVENTION

The present invention aims at the defects of the prior art and provides a technical method which automatically generates a topography section line using the grid of the submarine topography, and automatically analyzes the simplified section through carrying out second simplification and second derivation on the topography section, thus recognizing the automatic analysis and extraction of the foot point of the continental slope. The present invention may be applied to such technical links as automatic generation of any two-dimensional section line of a grid model, automatic recognition of the topography section features and integrated section drawing, generation of key boundary points in maritime delimitation and automatic recognition of the submarine geomorphy types and the like.

The present invention is achieved by the following technical solution:

An automatic recognition method of foot point of continental slope based on topography grid, comprising the following steps of:

(1) grid cutting: using a straight line $f(x, y)$ to cut a topography grid model $z_{i,j}$=Grid $(i, j)$ to generate a two-dimensional topography section line, where the origin coordinate and the end point coordinate of the straight line $f(x, y)$ are respectively $O_{(x1,y1)}$ and $E_{(x2,y2)}$;

$x_{i,j}$ and $y_{i,j}$ are the values of the x-coordinate and the y-coordinate of the grid point in row i and column j; and $z_{i,j}$ is a water depth value of the grid model in row i and column j;

The slope of the straight line $f(x, y)$ is that $k=(x1-x2)/(y1-y2)$, when $y1=y2$, the slope is expressed as: $k=(y1-y2)/(x1-x2)$;

(2) first derivation: carrying out first derivation on the two-dimensional topography section, and obtaining a point set of the coordinates and water depth value of the point of intersection between the straight line $f(x, y)$ and the grid model Grid $(i, j)$ through an intersection operation between the straight line $f(x, y)$ and the grid model based on the grid model of the submarine topography Grid $(i, j)$;

Generating an original data point set $G_0=\{g_i\}$ through step (1) and step (2), where each data point comprises distance, water depth, slope and second derivative value;

Where the coordinates and water depth value $dep(x, y)$ of the point of intersection between the straight line $f(x, y)$ and the grid model Grid $(i, j)$ are calculated according to the following situations:

(a) the point of intersection is located on the grid point Grid $(i, j)$: directly returning the distance between the coordinates $(x_{i,j}, y_{i,j})$ and the water $z_{i,j}$ depth of the grid point, and the origin $O(x_0, y_0)$: $dis(x, y)=\sqrt{(x-x_0)^2+(y-y_0)^2}$;

(b) the point of intersection is located on the row: when the point of intersection is located on row i and column j to j+1, the distance calculation is the same as step (a);

the y-coordinate of the point of intersection: $y=y_{i,j}$, when y1=y2, y=y1;

the x-coordinate of the point of intersection: $x=x1+(y-y1)\times k$, when y1=y2, $x=x_{i,j}$;

the water depth value of the point of intersection: $dep(x, y)=z_{i,j}+(x-x_{i,j})\times(z_{i,j+1}-z_{i,j})\div(x_{i,j+1}-x_{i,j})$;

(c) the point of intersection is located on the column: when the point of intersection is located on column j and row i to i+1, the distance calculation is the same as step (a);

the x-coordinate of the point of intersection: $x=x_{i,j}$;

the y-coordinate of the point of intersection: $y=y1+(x-x1)\times k$, when y1=y2, y=y1;

the water depth value of the point of intersection: $dep(x, y)=z_{i,j}+(y-y_{i,j})\times(z_{i,j+1}-z_{i,j})\div(y_{i,j+1}-y_{i,j})$ (d) the point of intersection is located in the grid; when the point of intersection is located on row i to i+1 and column j to j+1, the distance calculation is the same as step (a); the water depth value dep(x, y) of the point of intersection may be calculated according to an inverse distance square weighting method; the point of intersection is surrounded by four adjacent grid points, then the water depth value of the point is:

$$dep(x, y) = \frac{\sum_{i=1}^{i=4} w_i z_i}{\sum_{i=1}^{i=4} w_i}, \text{ wherein } w_i = \frac{1}{d_i^2}.$$

$z_i$, $w_i$ and $d_i$ are respectively the water depth value, the calculated weighted value and the distance value from the point of intersection of the four grid points;

the value of the y-coordinate of the foregoing point of intersection is: $O_{(x1,y1)}$ or $E_{(x2,y2)}$;

(3) First simplification: obtaining an extreme point of the second derivative section line and taking the extreme point as an inflection point to generate a new firstly simplified topography section line; generating a data point set $G_1=\{g_i\}$ after the first simplification through step (3);

(4) second simplification: using a D-P algorithm to carry out operation on the extreme section and reserve the data points complying with the D-P algorithm, thus obtaining a D-P topography section after the second simplification;

(5) second derivation: adopting the method in step (2) to carry out second derivation on the D-P topography section to obtain a new slope section line and a new second derivative section line based on the D-P topography section; generating a data point set $G_2=\{g_i\}$ after second simplification and derivation through step (4) and step (5);

(6) concave hull elimination: using a topography and slope judgment method to recognize and eliminate the concave hull topography in the D-P section; and generating a data point set $G_3=\{g_i\}$ after eliminating the concave hull topography through step (6);

(7) Integrated judgment: using slope, water depth, second derivative, concavity and convexity, features, continuity and segmentation judgment methods based on the D-P topography, slope and second derivative section to automatically recognize foot point of the continental slope in the topography section and automatically mark the foot point of the continental slope in the two-dimensional section, where the itemized judgment basis is as follows;

Itemized Judgment Steps:

(a) slope method: counting the mean slope values $ms_i$ in the point set $G_3=\{g_i\}$ by regions, and respectively obtaining the mean slope $\overline{g_1}$ in the shelf and sea basin region and the mean slope $\overline{g_2}$ in the continental slope region; traversing the point set $G_3=\{g_i\}$, where the points having a mean slope $ms_i\in|\overline{g_1}-\Delta g, \overline{g_1}+\Delta g|$ are in the shelf or sea basin region, and the points having a mean slope $ms_i\in|\overline{g_2}-\Delta g, \overline{g_2}+\Delta g|$ are in the continental slope region;

(b) water depth method: traversing the point set $G_3=\{g_i\}$ to carry out depth sorting on the data point of the mean slope $ms_i\in|\overline{g_1}-\Delta g, \overline{g_1}+\Delta g|$, and obtaining the mean water depth value $\overline{d_1}$ of the shelf and the mean water depth value $\overline{d_2}$ of the sea basin; traversing the point set $G_3=\{g_i\}$ again, where the water depth value $dep_i\in|\overline{d_1}-\Delta d, \overline{d_1}+\Delta d|$ is defined as the shelf, and the water depth value $dep_i\in|\overline{d_2}-\Delta d, \overline{d_2}+\Delta d|$ is defined as the sea basin;

(c) Second derivative: the foot point of the continental slope FOS is the point of the subsea having the maximum change of slope in the region from the continental slope to the sea basin, which is namely the second derivative extreme point;

(d) convex hull feature: the foot point of the continental slope FOS is located at the turning position from the continental slope to the sea basin; therefore, the topography has convex hull feature, which is represented by the feature that the second derivative value is a positive value data point;

(e) segmentation method: traversing the point set $G_3=\{g_i\}$, where the data point complying with the up slope $|us_i|\in|\overline{g_2}-\Delta g, \overline{g_2}+\Delta g|$ and the down slope $|ds_i|\in|\overline{g_1}-\Delta g, \overline{g_1}+\Delta g|$ is preliminarily judged as the foot point of the continental slope FOS;

(f) continuity method: traversing the point set $G_3=\{g_i\}$, recording the growth distance $bd_i$ of each point tracked towards the original point $pd_i$ and the growth distance of each point tracked towards the tail point; traversing the point set $G_3=\{g_i\}$ again to compare the $bd_i$ value and the $pd_i$ value of each point, where the point having the furthest distance is the foot point of the continental slope FOS;

Integrally apply steps (a) to (f), where the data point complying with the conditions of (c)~(f) at the same time is the foot point of the continental slope FOS.

In accordance with the regulations of Article 76 of the United Nations Convention on the Law of the Sea and the technical criteria of the UN Commission on the Limits of the Continental Shelf, the foot point of the continental slope locates at the point having the maximum change of slope at the base of the continental slope, which is namely the position of the second derivative extreme point at the base of the continental slope. The present invention recognizes topography section data points meeting the requirements in the topography section. The present invention proposes a quadratic fit method based on the second derivative extreme point and D-P algorithm, and a second derivation method for an original section and a D-P section, and gives out such integrated judgment methods as the judgment methods for the slope, water depth, second derivative, concavity and convexity, continuity and segmentation and the like, and finally realizes the quick and automatic recognition of the foot point of the continental slope.

The present invention has the advantageous effects that: the present invention has accurate mapping data, is convenient to operate, and is less affected by the natural weather in coastal mapping process of our country, and the like.

DETAILED DESCRIPTIONS OF THE PREFERRED EMBODIMENTS

The present invention is further descried hereunder by reference to embodiments.

Embodiment 1

Figure 1:
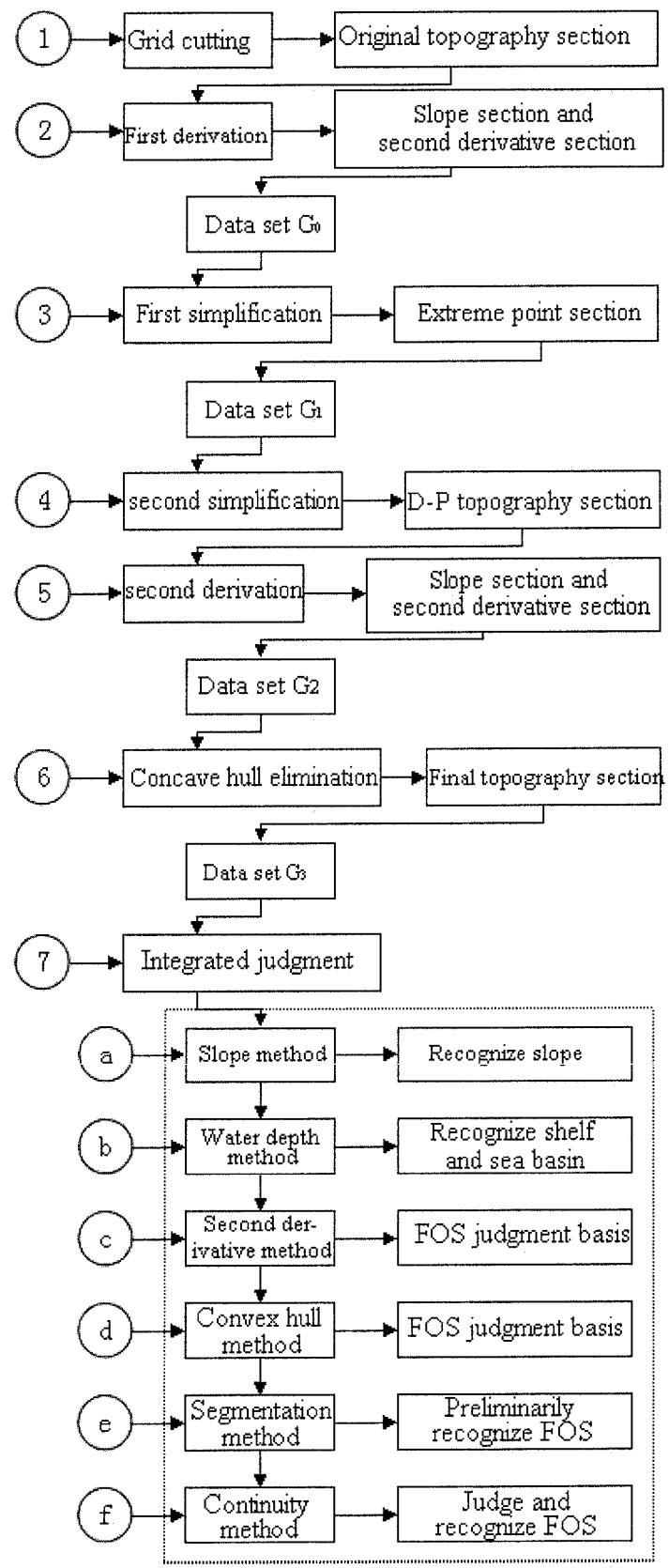
FIG. 1 is an overall flow schematic diagram of an algorithm of the present invention.

The process as shown in FIG. 1 comprises:
(1) Cutting Topography Grid to Generate Topography Section Line.

Firstly acquiring a grid model $z_{i,j}$=Grid (i, j) of the submarine topography in the continental margin, where the grid comprises M rows and N columns, and consists of M*N water depth points arranged regularly, as follows: $z_{i,j}$ is a water depth value in row i and column j of the grid model. The grid model needs to comprise such landform units as shelf, continental slope, sea basin and the like. The shelf, the continental slope and the sea basin are geomorphology terms. The shelf generally refers to a flat submarine topography region close to the mainland and having a water depth smaller than 200 m. The continental slope refers to a submarine topography region close to the shelf and having a dramatically deepened subsea water depth. The sea basin refers to a submarine topography region submarine topography region close to the continental slope and having a flat subsea, where the water depth of the sea basin may reach thousand of meters or several thousand of meters. The water depths in the continental slope region and in the sea basin region are associated with the property of the continental margin. In various continental margins around the world, the concrete water depths in the continental slope region and in the sea basin region vary. A plurality of existing tools or methods may be used to generate the grid model of the submarine topography.

In the present embodiment, cutting grid firstly: using a straight line f(x, y) to cut a topography grid model $z_{i,j}$=Grid (i, j) to generate a two-dimensional topography section line, where the origin coordinate and the end point coordinate of the straight line f(x, y) are respectively $O_{(x1,y1)}$ and $E_{(x2,y2)}$.

$x_{i,j}$ and $y_{i,j}$ are the values of the x-coordinate and the y-coordinate of the grid point in row i and column j; and $z_{i,j}$ is a water depth value of the grid point in row i and column j.

The slope of the straight line f(x, y) is that k=(x1−x2)/(y1−y2), when y1=y2, the slope is expressed as: k=(y1−y2)/(x1−x2).

Then carrying out first derivation: carry out first derivation on the two-dimensional topography section, and obtaining a point set of the coordinates and water depth value of the point of intersection between the straight line f(x, y) and the grid model Grid (i, j) through an intersection operation between the straight line f(x, y) and the grid model based on the grid model of the submarine topography Grid (i, j) to generate a slope section line and a second derivative section line.

Generating an original data point set $G_0=\{g_i\}$ through step (1) and step (2), where each data point comprises distance, water depth, slope and second derivative value.

The coordinates and water depth value dep(x, y) of the point of intersection between the straight line f(x, y) and the grid model Grid (i, j) are calculated according to the following situations.

The point of intersection is located on the grid point Grid (i, j): directly returning the distance between the coordinates $(x_{i,j}, y_{i,j})$ and the water depth $z_{i,j}$ of the grid point, and the origin $O(x_0, y_0)$: dis(x, y)=$\sqrt{(x-x_0)^2+(y-y_0)^2}$.

The point of intersection is located on the row: when the point of intersection is located on row i and column j to j+1, the distance calculation is the same as step (a).

the y-coordinate of the point of intersection: y=$y_{i,j}$, when y1=y2, y=y1.

The x-coordinate of the point of intersection: x=x1+(y−y1)×k, when y1=y2, x=$x_{i,j}$.

The water depth value of the point of intersection: dep(x, y)=$z_{i,j}$+(x−$x_{i,j}$)×($z_{i,j+1}$−$z_{i,j}$)÷($x_{i,j+1}$−$x_{i,j}$).

The point of intersection is located on the column when the point of intersection is located on column j and row i to i+1, the distance calculation is the same as step (a).

The x-coordinate of the point of intersection: x=$x_{i,j}$.

The y-coordinate of the point of intersection: y=y1+(x−x1)×k, when y1=y2, y=y1.

The water depth value of the point of intersection: dep(x, y)=$z_{i,j}$+(y−$y_{i,j}$)×($z_{i,j+1}$−$z_{i,j}$)÷($y_{i,j+1}$−$y_{i,j}$).

Obtaining a point set $G_0=\{g_i\}$ of the coordinates and water depth value of the point of intersection between the straight line f(x, y) and the grid model Grid (i, j) through an intersection operation between the straight line or broken line f(x, y) and the grid model based on the grid model of the submarine topography Grid (i, j), saving according to the distance between the point set $G_0$ and the origin $O_{(x1,y1)}$ of f(x, y), and forming a original topography section line $g_0$(x, y) the x-coordinate of which is the distance and the y-coordinate of which is the water depth value. In order to conveniently backtrack the plane coordinates of the points of the topography section, a rational structure needs to be designed and the plane coordinate, the distance and the water depth value of the point set $G_0$ needs to be saved at the same time.

The water depth value dep(x, y) of the point of intersection between f(x, y) and the grid Grid (i,j) are calculated according to the following situations.

(a) The point of intersection is located on the grid point. Directly return the distance between the coordinates and the water depth of the grid point, and the origin $O(x_0, y_0)$: dis(x, y)=$\sqrt{(x-x_0)^2+(y-y_0)^2}$.

(b) The point of intersection is located on the row. When the point of intersection is located on row i and column j to j+1, the distance calculation is the same as step (a). The water depth value of the point of intersection: dep(x, y)= $z_{i,j}+(x-x_{i,j})\times(z_{i,j+1}-z_{i,j})\div(x_{i,j+1}-x_{i,j})$. x(i, j) and z(i, j) are the values of the x-coordinate and the water depth value in row i and column j of the grid model.

(c) The point of intersection is located on the column. When the point of intersection is located on column j and row i to i+1, the distance calculation is the same as step (a). The water depth value of the point of intersection: dep(x, y)=$z_{i,j}+(y-y_{i,j})\times(z_{i,j+1}-z_{i,j})\div(y_{i,j+1}-y_{i,j})$. y(i, j) is the y-coordinate of the row i and column j of the grid.

(d) The point of intersection is located in the grid. When the point of intersection is located on row i to i+1 and column j to j+1, the distance calculation is the same as step (a). The water depth value dep(x, y) of the point of intersection may be calculated according to an inverse distance square weighting method. The point of intersection is surrounded by four adjacent grid points, then the water depth value of the point is:

$$dep(x, y) = \frac{\sum_{i=1}^{i=4} w_i z_i}{\sum_{i=1}^{i=4} w_i}, \text{ wherein } w_i = \frac{1}{d_i^2}.$$

$z_i$, $w_i$ and $d_i$ are respectively the water depth value, the calculated weighted value and the distance value from the point of intersection of the four grid points. The value of the y-coordinate of the foregoing point of intersection is: $O_{(x1,y1)}$ or $E_{(x2,y2)}$.

The original topography section formed needs to comply with the "shelf-continental slope-sea basin" feature; in other words, the topography section line is required to traverse the shelf region, the continental slope region and the sea basin region of the continental margin, so that the foot point of the continental slope can exist only, where this condition is also the foundation of subsequent work.

(2) Carrying Out First Derivation to Generate a Slope Section and a Second Derivative Section.

Carrying out first derivation on the topography section line $g_0$(x, y) to obtain a slope section $g_0'$(x, y) and second derivative section $g_0''$(x, y).

(a) Forming a slope section. For the i data point $g_i$ in the topography section, the before and after points are respectively $g_{i-1}$ and $g_{i+1}$. The water depth value ($z_i$) and the distance value ($d_i$) of the point are known, and derivation is carried out on the point $g_i$, so that the up slope ($us_i$), the down slope ($ds_i$) and the mean slope $ms_i$ of the point may be obtained.

$$us_i=(z_{i-1}-z_i)\div|d_{i-1}-d_i|$$

$$ds_i=(z_{i+1}-z_i)\div|d_{i+1}-d_i|.$$

$$ms_i=(|us_i|+|ds_i|)\div 2.$$

The up slope of the first point on the topography section cannot be directly calculated, and is assumed same as that of the second point of the section. The down slope of the tail point cannot be calculated as well and is assumed same as that of the down slope value of the second last point.

Each point $g'_i$ in the slope section $g_0'$(x, y) comprises such numerical values as coordinate, distance, up slope, down slope, water depth, mean slope and the like, where the coordinate, the distance and the water depth are same as that of the original topography section.

(b) Forming a second derivative section. Carry out derivation on the slope section g'(x, y), so that the second derivative section $g_0''$(x, y) of the section may be obtained, where the second derivative $sec_i$ of the point i is:

$$sec_i=(z_{i+1}-z_i)\div|d_{i+1}-d_i|^2.$$

Each point $g''_i$ in the second derivative section $g_0''$(x, y) comprises such numerical values as coordinate, distance, water depth and second derivative, where the coordinate, the distance and the water depth are same as that of the original topography section.

(3) Carrying Out First Simplification to Form an Extreme Topography Section.

The second derivative section g"(x, y) is obtained according to (a) in the foregoing step (2), where the section has multiple extreme points, and the water depths of the extreme points form a new simplified topography section $g_1$(x, y).

The derivatives before and after the second derivative $g''_i$ are respectively $g''_{i-1}$ and $g''_{i+1}$; if the numerical value symbols of $g''_{i-1}$ and $g''_{i+1}$ are the same, then the point is the extreme point, and a new point set $G_1=\{g_i\}$ is formed, where each point comprises distance, water depth, slope and second derivative value, and the point set $G_1=\{g_i\}$ forms new extreme point topography section $g_1$(x, y), slope section $g_1'$(x, y) and second derivative section $g_1''$(x, y).

Compared with the original topography section, first simplification is carried out on the extreme point topography section $g_1$(x, y) and only the data points that comply with the feature of the second derivative extreme point are remained.

(4) Carrying Out Second Simplification to Form a D-P Topography Section.

Douglas-Peucker algorithm (referred to as D-P algorithm) is a curve thinning algorithm proposed by David Douglas and Thomas Peucker in 1973, which may simply a number of redundant points of the curve, and remain the basic features of the curve. In brief, setting an original deviation value according to the dispersion of the curve, connecting the original point and the end point of the curve to form a straight line, and querying a point among all the turning points of the curve furthest from the straight line. If the distance between the point and the straight line is smaller than the original deviation value, then deleting all the turning points of the curve and return. If the distance between the point and the straight line is greater than the original deviation value, then retaining the point as the feature point, forming a new straight line with the original point of the curve and the point, and querying the furthest point again, and so on, till all the points of the curve are searched and the feature point is retained. Overall algorithm is the outstanding advantage of the D-P algorithm, which may reserve the point of the curve having the maximum bending form. The D-P algorithm has already been a conventional method for simplifying curves in the computer graphics.

Adopting the D-P algorithm to calculate in the extreme point topography section $g_1(x, y)$ obtained in step (3) to produce a data point set $G_2=\{g_1\}$ complying with the D-P algorithm and the deviation value, and forming a new topography section $g_2(x, y)$, where the section is the topography section after second simplification, which only reserves extremely few data points, and the water depth value and the distance value of each point are same as that of the same position point in the original section $g_0(x, y)$.

(5) Carrying Out Second Derivation to Form a New Slope Section and a New Second Derivative Section.

Adopting the method in step (2) to carry out derivation again on the topography expressed by the D-P topography section $g_2(x, y)$ formed after second simplification in step (4) to form a new slope section $g_2'(x, y)$ and a new second derivative section $g_2''(x, y)$.

(6) Recognizing and Eliminating Concave Hull Topography.

The concave hull topography affects the recognition and judgment of the foot point of the continental slope, and needs to be eliminated before final determination. The so-called concave hull topography refers to a raised topography in the topography section, which is a topography having a water depth value smaller than that of an adjacent point. Expressed according to a Decare coordinate system, the horizontal axis refers to the distance, the ordinate axis refers to the topography section of the water depth, the raised topography is expressed as a concave-down form in the Decare coordinate system; therefore, it is called as concave hull. The concave-down topography in the topography section is actually a convex hull in the Decare coordinate system. The concave hull topography in the D-P topography section after second simplification needs to be eliminated in the step.

The D-P topography section $g_2(x, y)$ formed in step (4) after second simplification is formed into the slope section $g_2'(x, y)$ in step (5) after second derivation. If the up slope ($us_i$) and the down slope ($ds_i$) of the point i in $g_2'(x, y)$ have the same symbol and are all positive values, then the point is the concave hull point, and shall be eliminated. Adopting second circulation to traverse all the points in the topography section $g_2(x, y)$, eliminating all the points complying with the concave hull feature and form a new point set $G_3=\{g_i\}$, where each data point comprises topography, slope and second derivative value, thus forming new topography section $g_3(x, y)$, slope section $g_3'(x, y)$ and second derivative section $g_3''(x, y)$.

(7) Integrally Recognizing and Judging the Foot Point of the Continental Slope.

Through the steps (1) to (6), the original topography section is largely simplified, but the basic features are reserved, the influences of partial minor topography and concave hull topography on the recognition of the foot point of the continental slope are eliminated, and the submarine topography section is simplified into a "shelf-continental slope-sea basin" three-segment type topography section. The shelf and the sea basin have flat topography. The subsea has smaller slope; the continental slope topography presents a slope shape and has a stable slope, and a convex hull feature is presented at the intersection of the continental slope and the sea basin.

The topographic features based on the foregoing simplification may adopt slope, water depth, second derivative, convex hull features, continuity and segmentation to query the topography section $g_3(x, y)$ formed in step (6), traverse the point set $G_3=\{g_i\}$, recognize and judge out the foot point of the continental slope, where the itemized judgment basis is as follows.

(a) Slope method. The mean slope values $ms_i$ of the topography section after second simplification are distributed in two slope intervals, which are respectively corresponding to the shelf and sea basin region, and the continental slope region. Count the mean slope values $ms_i$ in the point set $G_3=\{g_i\}$ by regions, and respectively obtain the mean slope $\overline{g_1}$ in the shelf and sea basin region and the mean slope $\overline{g_2}$ in the continental slope region.

Traversing the point set $G_3=\{g_i\}$, where the points having a mean slope $ms_i \in |\overline{g_1}-\Delta g, \overline{g_1}+\Delta g|$ are in the shelf or sea basin region, and the points having a mean slope $ms_i \in |\overline{g_2}-\Delta g, \overline{g_2}+\Delta g|$ are in the continental slope region, where $\Delta g$ is the slope tolerance value. The data points belonging to the continental slope topography region may be recognized through the step.

(b) Water depth method. The mean slope $\overline{g_1}$ of the flat region is obtained according to step (a). However, the shelf region and the sea basin region cannot be distinguished only according to the slope. The difference between the water depth of the shelf and the water depth of the sea basin is very big. Generally the water depth of the shelf is smaller 250 m, and the water depth of the sea basin is generally greater than 1000 m, and even reaches 4000 m. Traverse the point set $G_3=\{g_i\}$ to carry out depth sorting on the data point of the mean slope $ms_i \in |\overline{g_1}-\Delta g, \overline{g_1}+\Delta g|$, and obtain the mean water depth value $\overline{d_1}$ of the shelf and the mean water depth value $\overline{d_2}$ of the sea basin.

Traversing the point set $G_3=\{g_i\}$, the water depth value $dep_i \in |\overline{d_1}-\Delta d, \overline{d_1}+\Delta d|$ is defined as the shelf, and the water depth value $dep_i \in |\overline{d_2}-\Delta d, \overline{d_2}+\Delta d|$ is defined as the sea basin. Through this step, the data points belonging to the shelf and sea basin topography regions are recognized.

(c) Second derivative. The foot point of the continental slope FOS is the point of the subsea having the maximum change of slope in the region from the continental slope to the sea basin, which is namely the second derivative extreme point.

(d) Convex hull method. The foot point of the continental slope FOS is located at the turning position from the continental slope to the sea basin; therefore, the topography has convex hull feature, which is represented by the feature that the second derivative value is a positive value data point.

(e) Segmentation method. The foot point of the continental slope FOS is located at the turning position from the continental slope to the sea basin; and the topography has the "continental slope-sea basin" segmentation features. The foot point of the continental slope FOS points at the continental direction (towards the original point of the section) and is a continental slope, which is steep in topography and has a slope complying with the feature $|us_i| \in |\overline{g_2}-\Delta g, \overline{g_2}+\Delta g|$. The foot point of the continental slope FOS points at the sea direction (towards the tail point of the section) and has a slope complying with the feature $ms_i \in |\overline{g_1}-\Delta g, \overline{g_1}+\Delta g|$.

Traversing the point set $G_3=\{g_i\}$, and the data point complying with the up slope $|us_i| \in |\overline{g_2}-\Delta g, \overline{g_2}+\Delta g|$ and the down slope $|ds_i|\epsilon|\overline{g_1}-\Delta g,\overline{g_1}+\Delta g|$ is preliminarily judged as the foot point of the continental slope FOS.

(f) Continuity method. From steps (a) to (e), a plurality of points may possibly comply with the conditions. Abnormal points may be further judged and excluded according to the continuity of the curve. The topography section after simplification is single; therefore, track from the foot point of the continental slope FOS to the original point of the curve according to the mean slope value $ms_i$, were a complete continental slope may be tracked according to the segmentation features described in step (e). Track to the tail point of the curve, where a complete sea basin may be tracked according to the segmentation features described in step (e).

Traversing the point set $G_3=\{g_i\}$, record the growth distance $bd_i$ of each point tracked towards the original point $pd_i$ and the growth distance of each point tracked towards the tail point. Traverse the point set $G_3=\{g_i\}$ again to compare the $bd_i$ value and the $pd_i$ value of each point, where the point having the furthest distance is the foot point of the continental slope FOS. The FOS point determined according to the step has uniqueness.

Integrally applying steps (a) to (f), where the data point complying with the conditions of (c)~(f) at the same time is the foot point of the continental slope FOS.

With respect to a specific topography section, failure of correctively recognizing the foot point of the continental slope FOS complying with the conditions may be possibly caused by the two reasons. One situation is that the topography section selected possibly does not comply with "shelf-continental slope-sea basin" hypothesis and a turning topography of "continental slope-sea basin" does not exist. In this case, returning to step (1) to regenerate the topography section complying with the conditions, and repeating steps (2) to (7) again. The second situation is that over many data points are screened through the D-P algorithm, thus causing the residual data points are insufficient to describe the basic topographic features of the "shelf-continental slope-sea basin". In this case, returning to step (4), resetting a smaller distance deviation value, and repeating the steps (4) to (7) until the foot point of the continental slope FOS complying with the requirements in step (7) is recognized.

Random subsea two-dimensional topography section may be generated through step (1) based on the grid of the submarine topography; therefore, the present invention is applicable to the automatic generation of the two-dimensional topography section based on the grid. Based on the same method, the present invention may also be applicable to the generation of random two-dimensional section line for grids of other random types.

The slope and the second derivative of the topography section may be calculated through step (2). Therefore, the present invention may be applicable to the automatic generation of the slope and the second derivative section based on the topography section, and may be applicable to integrated section drawing including topography, slope and second derivative.

A simplified topography section reserving the skeleton features of the original section may be generated automatically through step (3) and step (4). Therefore, the present invention is applicable to simplification of a complicated topography section, and may be applied to generation of skeleton points of a two-dimensional section.

The concave-convex features of the curve may be determined according to the topography, the slope and the second derivative second derivative, the concave hull topography may be recognized through the step (6), and the shelf topography, the continental slope topography and sea basin topography may be recognized through the step (a) and step (b). Therefore, the present invention is applicable to the automatic analysis and recognition of the two-dimensional topography section features.

The foot point of the continental slope may be automatically recognized through the steps (1)~(7). Therefore, the present invention is applicable to the automatic judgment and recognition of the foot point of the continental slope based on the topography grid, and can be applied to the generation of the FOS+60M line and the 1% sediment thickness contours in maritime delimitation. In view of the similarity of the features between the turning point of the continental slope and the foot point of the continental slope at the turning position from the shelf to the continental slope, the present invention is also applicable to the automatic recognition and generation of the turning point of the continental slope.

Embodiment 2

For the given grid model of the submarine topography, we realize the automatic recognition (see FIG. 1 for the overall technical flow) of the foot point of the continental slope through seven steps such as grid cutting, first derivation, first topography simplification, second topography simplification, second derivation, concave hull topography elimination and integrated judgment. The detailed description of the embodiments is as follows:

(1) Cutting Grid.

Using a straight line f(x, y) to cut the grid model of the submarine topography Grid (i, j) and carrying out intersect operation to obtain a data point set $G_0=\{g_i\}$ of the original topography, where each data point comprises distance, water depth and plane coordinate values. Saving the point set $G_0=\{g_i\}$ according to the distance between the point set and the origin of f(x, y), and forming an original topography section line $g_0(x, y)$ the x-coordinate of which is the distance and the y-coordinate of which is the water depth value.

The topography section $g_0(x, y)$ needs to comply with the "shelf-continental slope-sea basin" features; in other words, the topography section line is required to traverse the shelf region, the continental slope region and the sea basin region of the continental margin; otherwise, a new topography section is regenerated by using a man-machine interaction manner.

Figure 2:
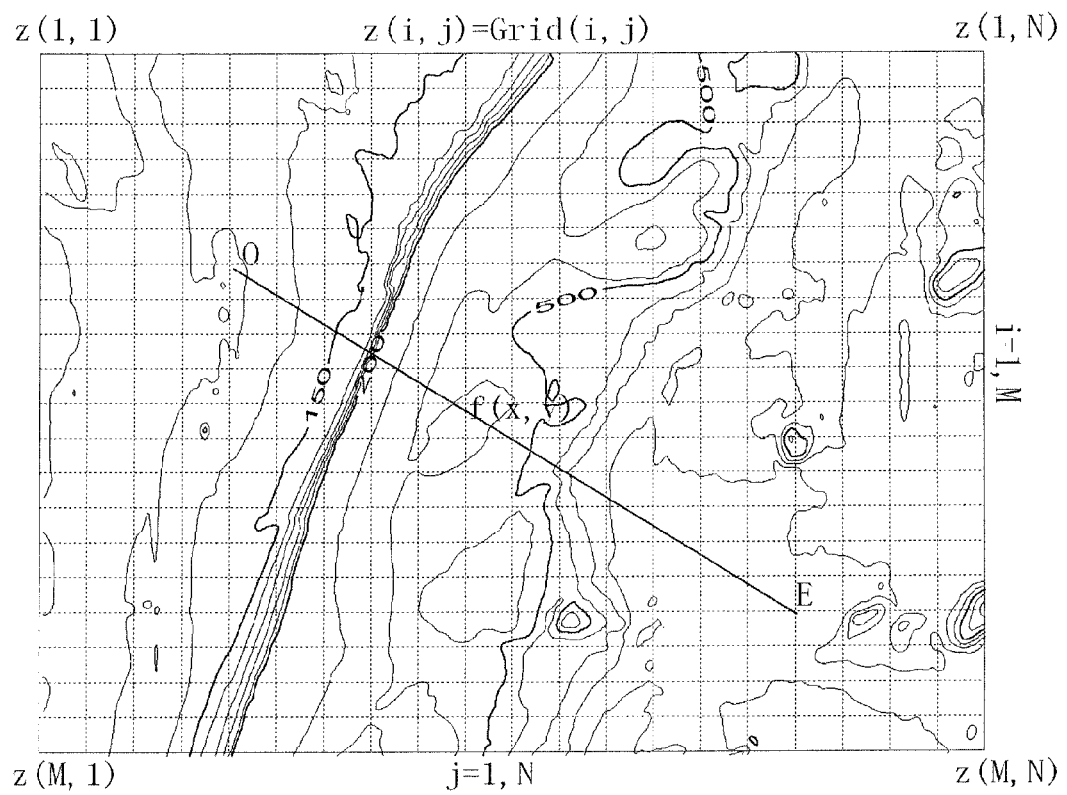
FIG. 2 is a schematic diagram of typical topography grid model and topography in embodiment 1 of the present invention, where OE is the location of an exemplary topography section line f(x, y), and a dotted line grid is a grid model Grid (i, j), which is the grid of the submarine topography for row M and column N.
Figure 3:
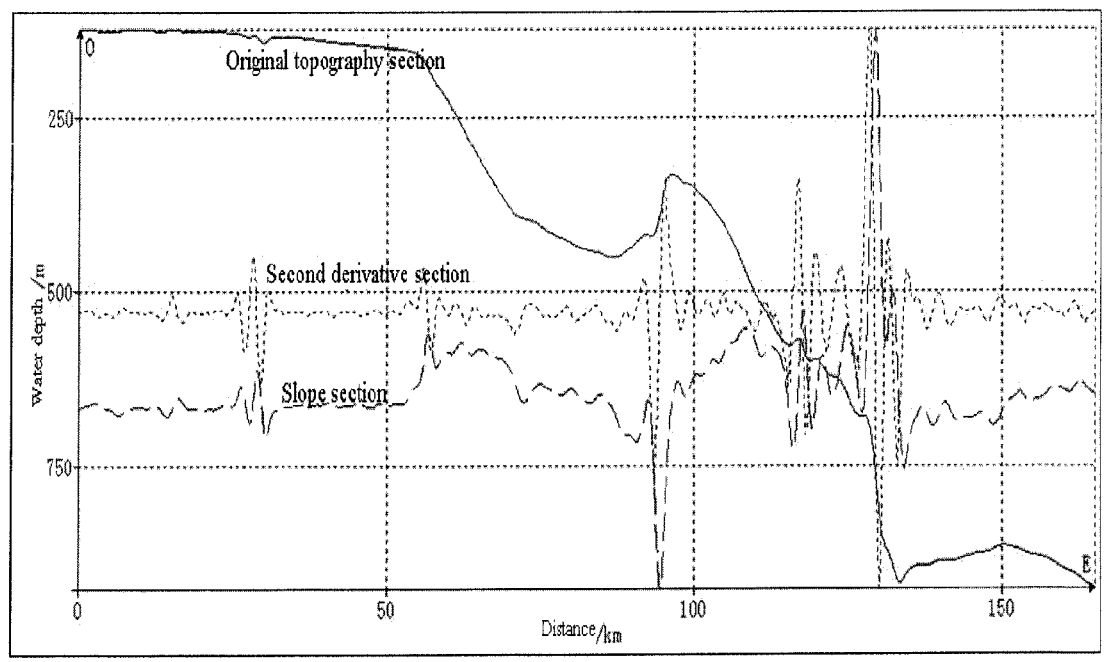
FIG. 3 is a schematic diagram of an original topography section in embodiment 1 of the present invention.

See FIG. 2 for a typical grid model of the submarine topography, see the straight line $\overrightarrow{OE}$ in FIG. 2 for the position of the section line, and see FIG. 3 for the topography section $g_0(x, y)$ formed.

(2) First Derivation.

Carrying out first derivation on the topography section line $g_0(x, y)$ to obtain a slope section $g_0'(x, y)$ and a second derivative section $g_0''(x, y)$.

Each data point $g'_i$ in the slope section $g_0'(x, y)$ comprises such numerical values as coordinate, distance, up slope, down slope, water depth, mean slope and the like, where the coordinate, the distance and the water depth are same as that of the original topography section.

Each data point $g''_i$ in the second derivative section $g_0''(x, y)$ comprises such numerical values as coordinate, distance, water depth and second derivative value, where the coordinate, the distance and the water depth are same as that of the original topography section.

A point set $G_0=\{g_i\}$ is formed together by the topography, the slope and the second derivative value in $g_0(x, y)$, $g_0'(x, y)$ and $g_0''(x, y)$.

(3) First Simplification.

The second derivative section $g_0''(x, y)$ is obtained according to the foregoing step (a), where the section has multiple extreme points. The extreme points of the original section are reserved only, and a new simplified topography section is formed by the extreme points. The judgment basis of the extreme points is that: the derivatives before and after the second derivative $g''_i$ are respectively $g''_{i-1}$ and $g''_{i+1}$; if the numerical value symbols of $g''_{i-1}$ and $g''_{i+1}$ are the same, then the point is the extreme point. A new point set $G_1=\{g_i\}$ is formed, where each point comprises distance and water depth, and the point set $G_1=\{g_i\}$ is formed, extreme point topography section $g_1(x, y)$. Compared with the original topography section, first simplification is carried out on the extreme point topography section $g_1(x, y)$ and only the water depth points that comply with the feature of the second derivative extreme point are reserved.

Figure 4:
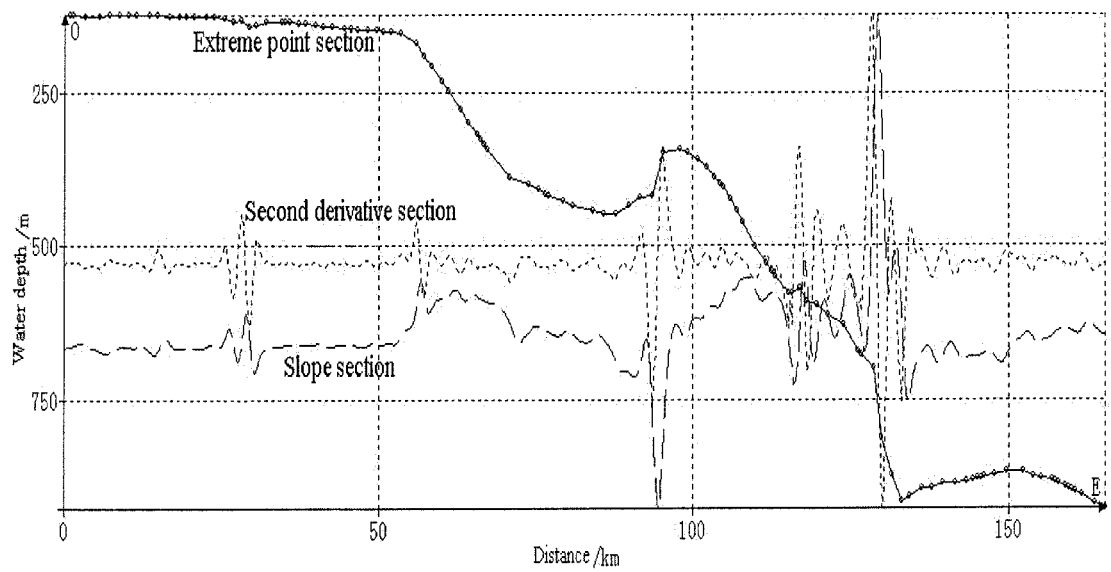
FIG. 4 is a schematic diagram of an extreme point topography section after first simplification in embodiment 1 of the present invention.

See FIG. 4 for the topography section after first simplification.

(4) Second Simplification.

Adopting the D-P algorithm to calculate the data point set $G_2=\{g_i\}$ complying with the requirements in the extreme point topography section $g_1(x, y)$ obtained in step (3), and forming a new topography section $g_2(x, y)$, where the section is the topography section after second simplification, which only reserves extremely few data points, and the water depth value and the distance value of each point are same as that in the original section $g_0(x, y)$.

Figure 5:
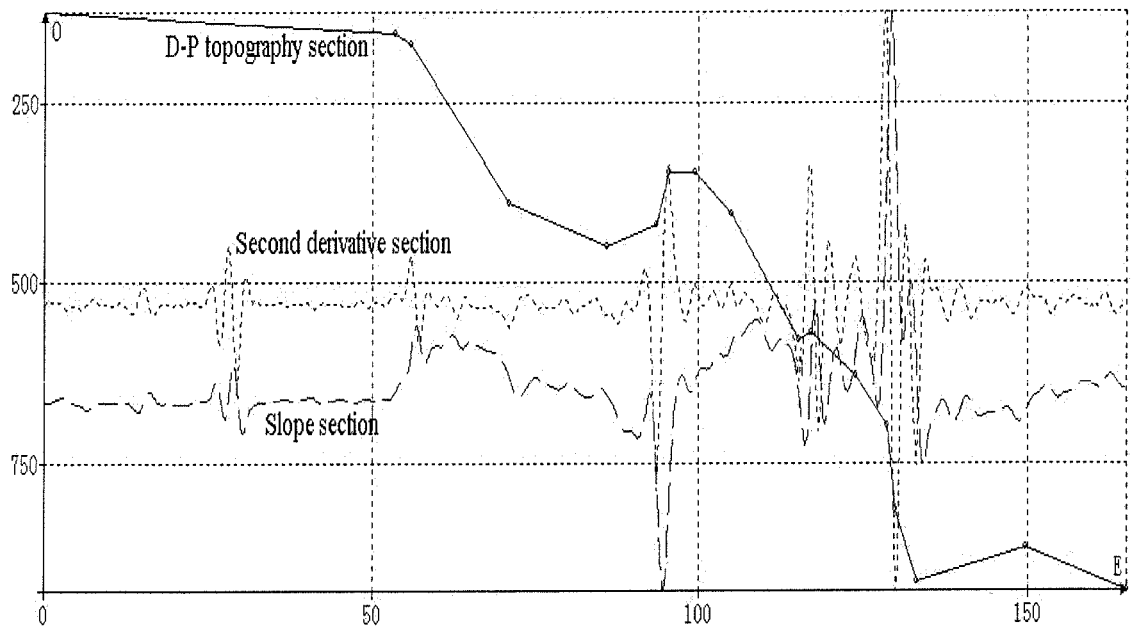
FIG. 5 is a schematic diagram of a D-P topography section after second simplification in embodiment 1 of the present invention.

See FIG. 5 for the D-P topography section after second simplification.

(5) Second Derivation.

Adopting the method in step (2) to carry out derivation again on the topography expressed by the D-P topography section $g_2(x, y)$ formed after second simplification in step (4) to form a new slope section $g_2'(x, y)$ and a new second derivative section $g_2''(x, y)$.

A point set $G_2=\{g_i\}$ is formed together by the topography, the slope and the second derivative value in $g_2(x, y)$, $g_2'(x, y)$ and $g_2''(x, y)$.

(6) Concave Hull Elimination

The D-P topography section $g_2(x, y)$ formed in step (4) after second simplification is formed into the slope section $g_2'(x, y)$ in step (5) after second derivation. If the up slope ($us_i$) and the down slope ($ds_i$) of the point i in $g_2'(x, y)$ have the same symbol and are all positive values, then the point is the concave hull point, and shall be eliminated.

Adopting second circulation to traverse all the points in the topography section $g_2(x, y)$, eliminating the points complying with the concave hull feature and then forming a new point set $G_3=\{g_i\}$, where each data point comprises topography, slope and second derivative value, thus forming new topography section $g_3(x, y)$, slope section $g_3'(x, y)$ and second derivative section $g_3''(x, y)$.

Figure 6:
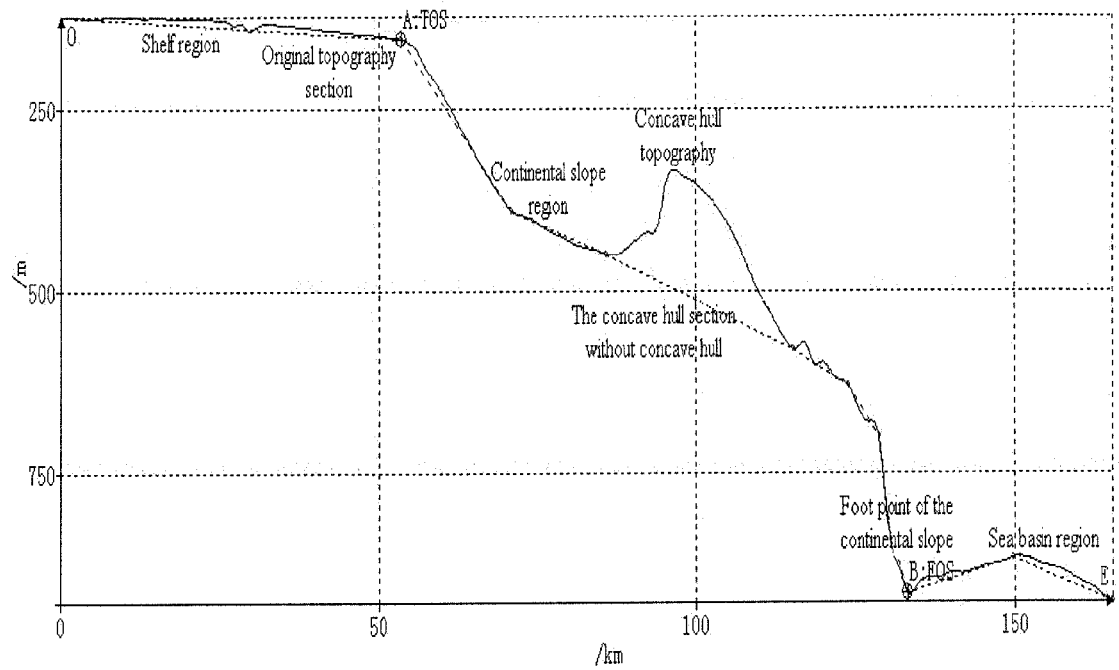
FIG. 6 is a schematic diagram of topography section without concave hulls and recognized foot point of the continental slope (turning point of the continental slope; FOS: foot point of the continental slope) in embodiment 1 of the present invention.

See FIG. 6 for the section after eliminating the concave hull.

(7) Integrated Judgment

Through the steps (1) to (6), the integrated section after simplification is obtained. We adopt water depth, slope, second derivative, convex hull features, continuity and segmentation to query the topography section $g_3(x, y)$ formed in step (6), traverse the point set $G_3=\{g_i\}$, recognize and judge out the foot point of the continental slope, where the itemized judgment basis is as follows.

(a) Slope method. Counting the mean slope values $ms_i$ in the point set $G_3=\{g_i\}$ by regions, and respectively obtaining the mean slope $\overline{g_1}$ in the shelf and sea basin region and the mean slope $\overline{g_2}$ in the continental slope region. Traversing the point set $G_3=\{g_i\}$, where the points having a mean slope $ms_i \in |\overline{g_1}-\Delta g, \overline{g_1}+\Delta g|$ are in the shelf or sea basin region, and the points having a mean slope $ms_i \in |\overline{g_2}-\Delta g, \overline{g_2}+\Delta g|$ are in the continental slope region.

(b) Water depth method. Traversing the point set $G_3=\{g_i\}$ to carry out depth sorting on the data point of the mean slope $ms_i \in |\overline{g_1}-\Delta g, \overline{g_1}+\Delta g|$, and obtaining the mean water depth value $\overline{d_1}$ of the shelf and the mean water depth value $\overline{d_2}$ of the sea basin. Traversing the point set $G_3=\{g_i\}$ again, where the water depth value $dep_i \in |\overline{d_1}-\Delta d, \overline{d_1}+\Delta d|$ is defined as the shelf, and the water depth value $dep_i \in |\overline{d_2}-\Delta d, \overline{d_2}+\Delta d|$ is defined as the sea basin.

(C) Second derivative. The foot point of the continental slope FOS is the point of the subsea having the maximum change of slope in the region from the continental slope to the sea basin, which is namely the second derivative extreme point.

(d) Convex hull feature. The foot point of the continental slope FOS is located at the turning position from the continental slope to the sea basin; therefore, the topography has convex hull feature. It specifically appears in that the second derivative value is a positive value data point.

(e) Segmentation method. The adjacent points before and after the foot point of the continental slope are respectively the continental slope and the sea basin, where the continental slope and the sea basin are recognized through step (a) and step (b). Traversing the point set $G_3=\{g_i\}$, and the data point complying with the up slope complying with $|us_i| \in |\overline{g_2}-\Delta g, \overline{g_2}+\Delta g|$ and the down slope complying with $|ds_i| \in |\overline{g_1}-\Delta g, \overline{g_1}+\Delta g|$ is preliminarily judged as the foot point of the continental slope FOS.

(f) Continuity method. Traversing the point set $G_3=\{g_i\}$, record the growth distance $bd_i$ of each point tracked towards the initial point and the growth distance $pd_i$ of each point tracked towards the tail point. Traversing the point set $G_3=\{g_i\}$ again to compare the value $bd_i$ and the value $pd_i$ of each point, where the point having the furthest distance is the foot point of the continental slope FOS.

Integrally applying steps (a) to (f), where the data point complying with the conditions of (c)~(f) at the same time is the foot point of the continental slope FOS. See FIG. 6 for the finally recognized foot point of the continental slope.

Figure 7:
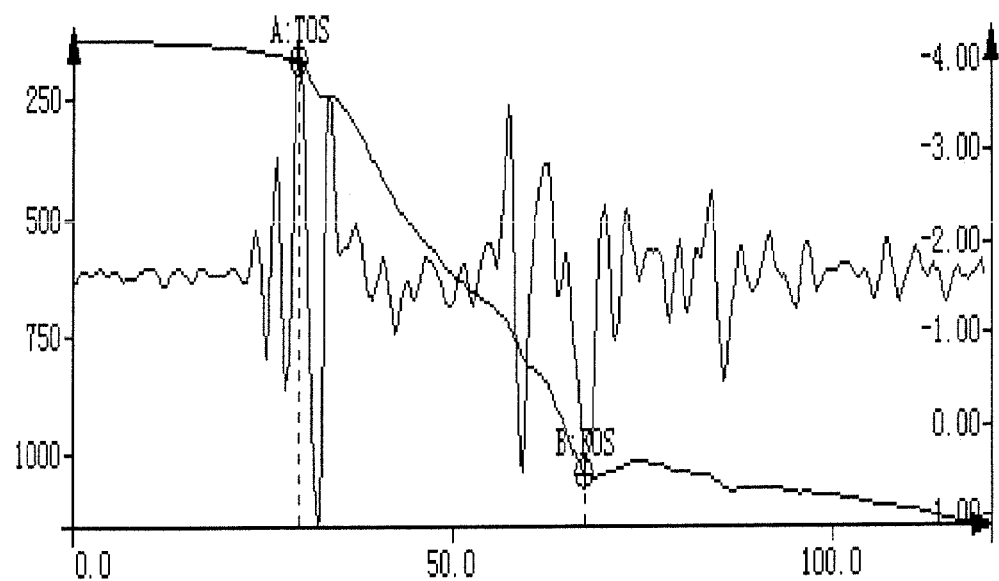
FIG. 7 is a schematic diagram of a standard topography section and recognized foot point of the continental slope in embodiment 1 of the present invention, where TOS is the turning point of the continental slope, FOS is the foot point of the continental slope, and the break line in the diagram is a second derivative curve.

We use C++ programming language to realize the algorithm of the present invention on a 2.40 GHz Intel® Core 2, 2 GB Core 2 PC, using a typical grid model of the submarine topography of the continental margin (see FIG. 2), cutting the typical submarine topography section is cut from the shelf to the sea basin, and adopting the technical method of the present invention to accurately recognize the foot point of the continental slope FOS. See FIG. 1 for the overall technical flow of the present invention. See FIG. 2 to FIG. 6 for the specific steps of recognizing the foot point of the continental slope via the typical section. Tests of automatically recognizing the foot point of the continental slope are carried out on different types of topography sections. The test results are as shown in FIG. 7. The automatic recognition of the turning point of the continental slope is also realized by adopting the same method of the present invention. See the turning point of the continental slope TOS in FIG. 6 and FIG. 7.

Embodiment 3

Figure 8:
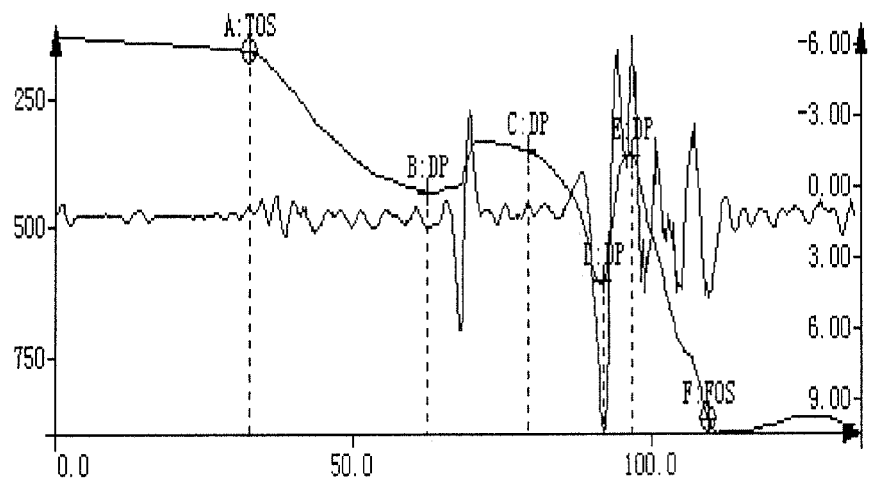
FIG. 8 is a schematic diagram of a complicated topography section and recognized foot point of the continental slope in embodiment 1 of the present invention, where TOS is the turning point of the continental slope, FOS is the foot point of the continental slope, and the break line in the diagram is a second derivative curve.

Using the same method as that in embodiment 1 to carry out automatic recognition on the topography section of a complicated continental slope, where the results as shown in FIG. 8 can be obtained.

Embodiment 4

Figure 9:
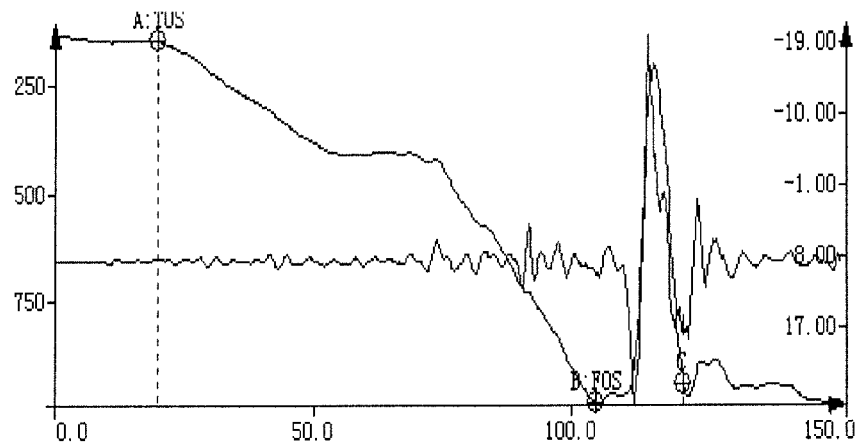
FIG. 9 is a schematic diagram of a topography section having sea-mount and recognized foot point of the continental slope in embodiment 1 of the present invention, where TOS is the turning point of the continental slope, FOS is the foot point of the continental slope, and the break line in the diagram is a second derivative curve.

Using the same method as that in embodiment 1 to carry out automatic recognition on the topography section having a sea-mount, where the results as shown in FIG. 9 can be obtained.

Embodiment 5

Figure 10:
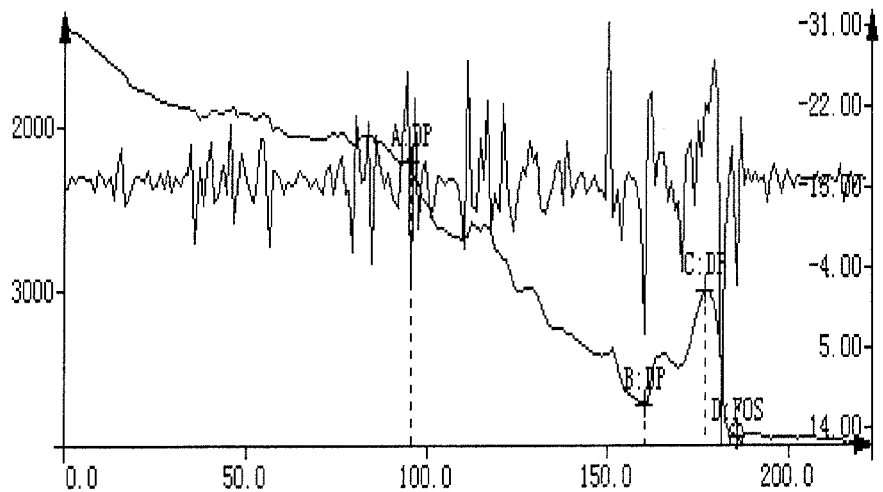
FIG. 10 is a schematic diagram of a topography section having bulges and recognized foot point of the continental slope in embodiment 1 of the present invention, where TOS is the turning point of the continental slope, FOS is the foot point of the continental slope, and the break line in the diagram is a second derivative curve.

Using the same method as that in embodiment 1 to carry out automatic recognition on the topography section having bulges of the continental slope, where the results as shown in FIG. 10 can be obtained.

The invention claimed is:

1. A computer implemented automatic recognition method of foot point of continental slope based on topography grid executed on a processor, comprising the following steps:

acquiring, using a computer, a topographical grid model of a submarine topography in a continental region, wherein the grid model comprises at least a continental slope, a sea basin region, and a shelf region;

(1) grid cutting: using a straight line f(x, y) to cut a topography grid model $z_{i,j}$=Grid (i, j) to generate a two-dimensional topography section line, where origin coordinate and end point coordinate of the straight line f(x, y) are respectively $O_{(x1,y1)}$ and $E_{(x2,y2)}$;

$x_{i,j}$ and $y_{i,j}$ are values of x-coordinate and y-coordinate of a grid point in row i and column j, and $z_{i,j}$ is a water depth value of the grid model in row i and column j;

a slope of the straight line f(x, y) is that k=(x1−x2)/(y1−y2), when y1=y2, the slope is expressed as: k=(y1−y2)/(x1−x2);

(2) first derivation: carrying out first derivation on the two-dimensional topography section, and obtaining a point set of coordinates and the water depth value of a point of intersection between the straight line f(x, y) and the grid model Grid (i, j) through an intersection operation between the straight line f(x, y) and the grid model Grid (i, j);

generating an original data point set $G_0=\{g_i\}$ through step (1) and step (2), where each data point comprises distance, water depth, slope and second derivative value;

where the coordinates of the point of intersection between the straight line f(x, y) and the grid model Grid (i, j) and the water depth value dep(x, y) of the point of intersection between the straight line f(x, y) and the grid model Grid (i, j) are calculated according to following situations:

(a) the point of intersection is located on a grid point Grid (i, j): directly returning the distance between the coordinates $(x_{i,j}, y_{i,j})$ of the grid point and the water depth $z_{i,j}$ of the grid point, and the origin $O(x_0, y_0)$: $dis(x, y)=\sqrt{(x-x_0)^2+(y-y_0)^2}$;

(b) the point of intersection is located on the row: when the point of intersection is located on row i and column j to j+1, the distance calculation is the same as step (a);
y-coordinate of the point of intersection: $y=y_{i,j}$, when y1=y2, y=y1;
x-coordinate of the point of intersection: x=x1+(y−y1)×k, when y1=y2, $x=x_{i,j}$;
the water depth value of the point of intersection: $dep(x, y)=z_{i,j}+(x-x_{i,j})\times(z_{i,j+1}-z_{i,j})\div(x_{i,j+1}-x_{i,j})$;

(c) the point of intersection is located on the column: when the point of intersection is located on column j and row i to i+1, the distance calculation is the same as step (a);
x-coordinate of the point of intersection: $x=x_{i,j}$;
y-coordinate of the point of intersection: y=y1+(x−x1)×k, when y1=y2, y=y1;
the water depth value of the point of intersection: $dep(x, y)=z_{i,j}+(y-y_{i,j})\times(z_{i,j+1})/(y_{i,j+1}-y_{i,j})$;

(d) the point of intersection is located in the grid: when the point of intersection is located on row i to i+1 and column j to j+1, the distance calculation is the same as step (a);
the water depth value dep(x, y) of the point of intersection may be calculated according to an inverse distance square weighting method;
the point of intersection is surrounded by four adjacent grid points, then the water depth value of the point is:

$$dep(x, y) = \frac{\sum_{i=1}^{i=4} w_i z_i}{\sum_{i=1}^{i=4} w_i}, \text{ wherein } w_i = \frac{1}{d_i^2}.$$

$z_i$, $w_i$ and $d_i$ are respectively the water depth value, calculated weighted value and distance value from the point of intersection of the four adjacent grid points;
the value of the y-coordinate of the foregoing point of intersection is: $O_{(x1,y1)}$ or $E_{(x2,y2)}$;

(3) first simplification: obtaining an extreme point of a second derivative section line and taking the extreme point as an inflection point to generate a new firstly simplified topography section line; generating a data point set $G_1=\{g_i\}$ after the first simplification through step (3);

(4) second simplification: using a D-P algorithm to carry out operation on the extreme section and reserve the data points complying with the D-P algorithm, thus obtaining a D-P topography section after the second simplification;

(5) second derivation: adopting the method in step (2) to carry out second derivation on the D-P topography section to obtain a new slope section line and a new second derivative section line based on the D-P topography section, generating a data point set $G_2=\{g_i\}$ after second simplification and derivation through step (4) and step (5);

(6) concave hull elimination: using a topography and slope judgment method to recognize and eliminate concave hull topography in the D-P section, and generating a data point set $G_3=\{g_i\}$ after eliminating the concave hull topography through step (6);

(7) integrated judgment: using slope, water depth, second derivative, concavity and convexity, features, continuity and segmentation judgment methods based on the D-P topography, slope and second derivative section to automatically recognize foot point of the continental slope in the topography section and automatically mark the foot point of the continental slope in the two-dimensional section, where itemized judgment steps are as follows:

(a) slope method: counting mean slope values $ms_i$ in the point set $G_3=\{g_i\}$ by regions, and respectively obtaining mean slope $\overline{g_1}$ in a shelf and sea basin region and mean slope $\overline{g_2}$ in the continental slope region; traversing the point set $G_3=\{g_i\}$, where the points having a mean slope $ms_i \in |\overline{g_1}-\Delta g, \overline{g_1}+\Delta g|$ are in the shelf or sea basin region, and the points having a mean slope $ms_i \in |\overline{g_2}-\Delta g, \overline{g_2}+\Delta g|$ are in the continental slope region;

(b) water depth method: traversing the point set $G_3=\{g_i\}$ to carry out depth sorting on the data point of the mean slope $ms_i \in |\overline{g_1}-\Delta g, \overline{g_1}+\Delta g|$, and obtaining the mean water depth value $\overline{d_1}$ of the shelf and the mean water depth value $\overline{d_2}$ of the sea basin, traversing the point set $G_3=\{g_i\}$ again, where the water depth value $dep_i \in |\overline{d_1}-\Delta d, \overline{d_1}+\Delta d|$ is defined as the shelf, and the water depth value $dep_i \in |\overline{d_2}-\Delta d, \overline{d_2}+\Delta d|$ is defined as the sea basin;

(c) second derivative: the foot point of the continental slope (FOS) is the point of the subsea having the maximum change of slope in the region from the continental slope to the sea basin, which is namely the second derivative extreme point;

(d) convex hull feature: the foot point of the continental slope (FOS) is located at the turning position from the continental slope to the sea basin, the topography has convex hull feature, which is represented by the feature that the second derivative value is a positive value data point;

(e) segmentation method: traversing the point set $G_3=\{g_i\}$, where the data point complying with the up slope $|us_i| \in |\overline{g_2}-\Delta g, \overline{g_2}+\Delta g|$ and the down slope $|ds_i| \in |\overline{g_1}-\Delta g, \overline{g_1}+\Delta g|$ is preliminarily judged as the foot point of the continental slope (FOS);

(f) continuity method: traversing the point set $G_3=\{g_i\}$, recording growth distance $bd_i$ of each point tracked towards an original point $pd_i$ and a growth distance of each point tracked towards the tail point; traversing the point set $G_3=\{g_i\}$ again to compare the $bd_i$ value and the $pd_i$ value of each point, where the point having the furthest distance is the foot point of the continental slope (FOS);

integrally apply steps (a) to (f), where the data point complying with the conditions of (c)~(f) at the same time is the foot point of the continental slope (FOS); and (g) generating a submarine topographic map based on the foot point of the continental slope (FOS) obtained above, which includes the continental slope region, the shelf region, and the sea basin region, along with a location of the foot point of the continental slope (FOS) displayed on the submarine topographic map.

* * * * *